United States Patent [19]

Ballinger et al.

[11] Patent Number: 4,604,669
[45] Date of Patent: Aug. 5, 1986

[54] MAGNETOSTRICTIVE RECORD HEAD

[75] Inventors: Dale O. Ballinger, Lakewood; William R. Chynoweth; Gerald J. Wade, both of Littleton, all of Colo.

[73] Assignee: Honeywell Inc., Minneapolis, Minn.

[21] Appl. No.: 647,192

[22] Filed: Sep. 4, 1984

[51] Int. Cl.[4] .............................................. G11B 5/30
[52] U.S. Cl. ..................................... 360/113; 360/115
[58] Field of Search .............................. 360/113, 115

[56] References Cited

U.S. PATENT DOCUMENTS

| 3,053,941 | 9/1962 | Johnson | 360/113 |
| 3,639,699 | 2/1972 | Tiemann | 360/126 |
| 3,921,217 | 11/1975 | Thompson | 360/113 |
| 3,975,772 | 8/1976 | Lin | 360/113 |
| 4,001,890 | 1/1977 | Kayser | 360/121 |
| 4,242,710 | 12/1980 | Hempstead et al. | 360/113 |
| 4,255,772 | 3/1981 | Perez | 360/113 |
| 4,314,297 | 2/1982 | Lazzari | 360/113 |
| 4,380,784 | 4/1983 | Desserre et al. | 360/126 |
| 4,423,451 | 12/1983 | Chi | 360/125 |
| 4,520,413 | 5/1985 | Piotrowski et al. | 360/113 |

OTHER PUBLICATIONS

"Ferromagnetism", Bozorth, Chapter 13; pp. 596–598.
"High Technology", Mar. 1983, p. 26.
"The Physics of Magnetic Recording" by Mee, Chapter 6, p. 195.
"Materials for Elastic Surface Wave Applications", J. de Klerk.

Primary Examiner—Robert S. Tupper
Attorney, Agent, or Firm—Charles L. Rubow

[57] ABSTRACT

A magnetostrictive record and playback head is disclosed which utilizes an acoustic wave traveling along the surface of piezoelectric material so as to distort the surface thereof and to change the stress in a layer of magnetostrictive material along that surface at a point which depends upon the position of the traveling acoustic wave. At the point where the magnetostrictive material is changed, the material is magnetic so that a pulse in an adjacent conductor will cause a flux to form that can deposit a magnetic signal on adjacent magnetic tape.

11 Claims, 2 Drawing Figures

MAGNETOSTRICTIVE RECORD HEAD

BACKGROUND OF THE INVENTION

In the art of magnetic recording, a patent 3,053,941 issued Sept. 11, 1962, disclosing a magnetostrictive transducer for recording and reproducing information on magnetic tape. The head uses a tube of magnetostrictive material enveloped by a "winding" of conductive material. The structure is placed under stress and longitudinal acoustic waves propagate along the tube causing the stress to change and creating a moving ring having magnetizable properties. A longitudinal non-magnetic gap adjacent to the magnetic tape is used for recording and reading the magnetic patterns onto and off the tape.

The trend in recent years has been towards higher frequency response and shorter gaps which require much smaller gap depths which, in the case of patent 3,053,941, relates to the tube thickness and, as a result, the idea set forth in this patent has become impractical because tubes having a wall thickness of 1 mil. or less would be required and these are mechanically unacceptable. Magnetostrictive materials can be deposited on non-magnetic substrates for mechanical rigidity, but the interaction between the speed of propagation in the substrate and the magnetic material is likely to cause perturbations and the materials are mechanically soft so that they will not be particularly wear-resistant making the head life very short.

The above-referred to patent 3,053,941 discloses a longitudinal wave which is propagated down the tube. There are two other types of acoustic waves which are well known and have been studied for use in several applications. In addition to the longitudinal wave there is a "shear wave" and a "Rayleigh wave". All three of these waves can, and in fact normally do, exist in a solid body that is being excited with acoustic energy. The Rayleigh wave travels slower than either of the two others and exists only near the surface of the material. The energy is concentrated in a relatively small region (approximately a wavelength in depth) and is assessable from the surface.

Surface acoustic wave (SAW) devices have been fabricated in the past as can be seen, for example, in an article entitled "Materials for elastic surface wave application" by J. D. Klerk on page 35 of the 1970 Ultrasonic Symposium Proceedings where surface of piezoelectric material is pulsed with an electrical signal to cause a surface wave to propagate down the length of the material. Such devices have been used as filters and for light scattering among other things.

Thin film magnetic heads that make use of nickel iron alloys are also well known and are in common use today as magnetic disc heads. Some nickel iron alloys are also highly magnetostrictive. Other alloys, as well as pure magnetic materials such as the metals nickel and iron, are also magnetostrictive. Although the description herein describes the use of nickel iron alloy as the magnetizable material, it is not intended that the invention be limited to this alloy.

Magnetostriction is commonly regarded as the change in stress in a material as a result of the presence of a magnetic field. The converse is also true. The magnetic properties of a material are changed as a result of induced stress in the material. It is this later phenomenon which is the more pertinent to the present invention.

SUMMARY OF THE INVENTION

The present invention makes use of the property of some materials to change magnetic characteristics upon change in stress in the material to create a magnetic field at a desired place and at a desired time. More particularly, the present invention uses the magnetostrictive quality of nickel iron alloys in combination with a SAW device to create a fast, highly accurate and wear-resistant head by utilizing a thin film technology. The head produced is long enough to extend across the width of a magnetic tape on which information is to be recorded. A Rayleigh wave is caused to propagate along the surface where the thin film head is deposited and thus create a stress pattern in the nickel iron alloy which will allow the recording and reproducing of magnetic information on the tape in local regions.

DETAILED DESCRIPTION OF THE PREFERRED EMBODIMENT

Figure 1:
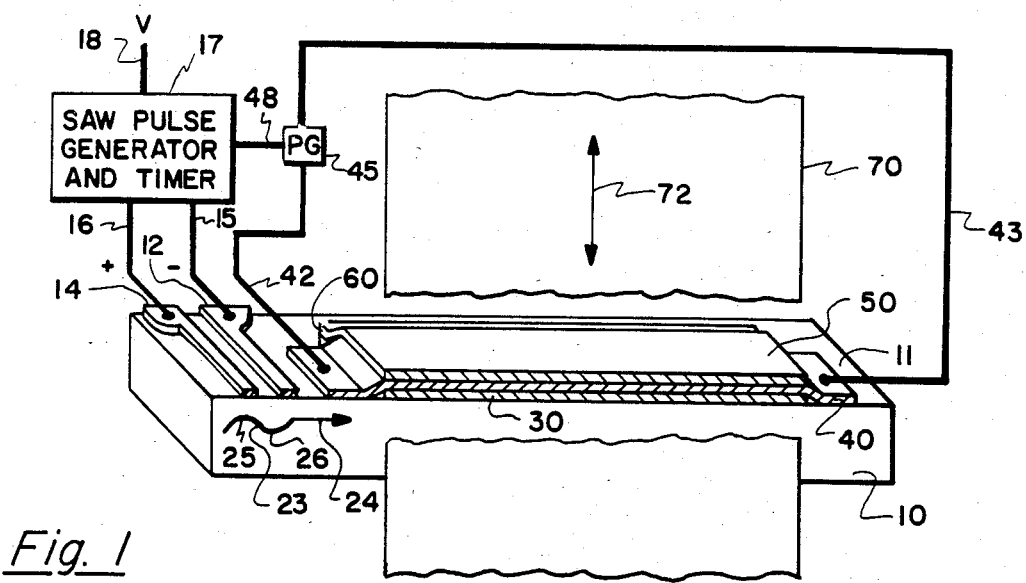
FIG. 1 shows a perspective view of a magnetostrictive recording head in accordance with the present invention.

In FIG. 1 a base of piezoelectric material identified by reference numeral 10 is shown and which, in the preferred embodiment, is comprised of quartrz or lithium niobate but other piezoelectric materials may be employed as well.

On the upper substantially planar surface 11 of piezoelectric material 10 and near the left end thereof, a pair of electrodes 12 and 14 have been vacuum deposited and shown in FIG. 1 to be connected by conductors 15 and 16 respectively to a SAW pulse generator box 17 which includes timers and switches for purposes to be described. SAW pulse generator 17 is connected to a source of voltage V by a conductor 18 and operates to send, for example, a positive pulse to electrode 14 and a negative pulse to electrode 12 as shown by the "+" and "−" signs respectively. As is known in the art, when such a difference in potential is applied to piezoelectric material, the surface of the material deforms in a manner like that shown in FIG. 2 and a wave is propagated in both directions from the point of application of the energy.

Figure 2:
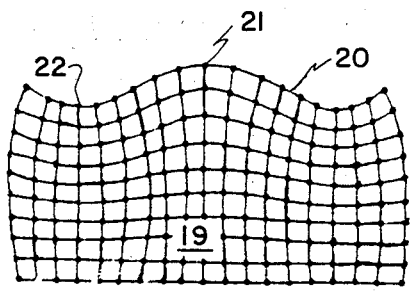
FIG. 2 is a schematic representation of a Rayleigh wave in a material.

In FIG. 2 a representation of a Rayleigh wave is shown and the energy distribution on and below the surface of a material 19. It is seen that the surface is stretched at point 21 and is compressed at point 22. Thus, if the material 19 was originally compressed, the compression would be relieved at point 21 and, if the material 19 was originally in tension, the tension would be relieved at point 22.

In FIG. 1, the surface deformation is shown by a wave identified by reference numeral 23 which travels to the left (where it will be absorbed to prevent reflected energy or, perhaps, used in a second piezoelectric head, not shown, to the left of the head of FIG. 1) and to the right as shown by arrow 24. The upper surface 11 of the piezoelectric material 10 is thus deformed as the wave 23 moves. The surface deformation causes increases and decreases in the stress along the surface at the points such as 25 and 26 where the material bends upward and downward respectively.

To the right of electrodes 12 and 14 in FIG. 1, a layer of magnetostrictive material 30 has been deposited on the upper surface 11 of piezoelectric material 10. The magnetostrictive material 30 may be a nickel iron alloy that is highly magnetostrictive and is preferably one which has a different thermal coefficient of expansion and contraction than the piezoelectric material 10. When the magnetostrictive material is deposited on the piezoelectric material 10, the process may be performed at an elevated temperature so that when the two materials cool, the magnetostrictive material 30 will be either pushed together slightly or pulled apart slightly by the forces existing in the piezoelectric material 10. Thus, the magnetostrictive material will be in a stressed condition when it has cooled. Now when the acoustic wave 23 travels from left to right in the piezoelectric material 10, the magnetostrictive material 30 will experience the changes in stress in the surface 11 and accordingly may become less stressed or substantially unstressed at a point which moves with the speed of the wave 20 from left to right. For example, if the magnetostrictive material were being pushed together under compression, then the acoustic wave when it bends the surface 11 of piezoelectric material 10 upwardly, i.e., as at point 25 of curve 23, would relax or overcome the compression in the magnetostrictive material 30. On the other hand, if the magnetostrictive material had been stretched, or placed in tension to begin with, then the lower part of curve 23, i.e., point 26, would operate to decrease the tension and thus bring the magnetostrictive material back to a relaxed condition.

At the point along the magnetostrictive material 30, where the material becomes unstressed, it becomes temporarily easy to magnetize and is thus capable of producing a magnetic field as will be further explained. A second layer of material which is conductive and identified in FIG. 1 by reference numeral 40, is shown deposited over the magnetostrictive material 30. The ends of the conductive material 40 are connected by conductors 42 and 43 respectively to pulse generator 45 connected to the SAW pulse generator 17 by a conductor 48. At an appropriate time, pulse generator 45 will send an electrical pulse down conductive layer 40.

To complete the magnetic circuit, an upper layer 50 of magnetostrictive material is also shown in FIG. 1 deposited over the conductive layer 40. Layer 50 is connected or magnetically coupled to the lower layer or pole piece 30 at the far edge thereof identified by reference numeral 60. Thus, it is seen that the conductive material 40 lies between two layers of magnetostrictive material 30 and 50 on the piezoelectric base 10. All of these layers, being quite thin, experience the contractions and expansions of surface 11 as the acoustic wave 23 moves to the right after a pulse has been presented via electrodes 12 and 14. It should be noted that while both layers 30 and 50 experience the distortions of the acoustic wave 23, it is possible for only one of the layers to be deformed and still have an operable head.

Also shown in FIG. 1 in partially removed configuration is a magnetic tape 70 which is driven by standard tape driving means across the edges of the layers of material 30, 40, and 50 in an upward or downward direction as shown by arrow 72.

When it is desired to leave a magnetic signal on tape 70, a pulse on electrodes 12 and 14 from SAW pulse generator 17 produces a pulse at electrodes 12 and 14 which starts the acoustic wave 23 on its journey to the right in FIG. 1. Then at a time determined by the timer in SAW pulse generator 17, a signal is presented on conductor 48 to pulse generator 45 which, in turn, produces an electrical pulse on conductor 42 to the conductive layer 40. Depending upon what portion of the magnetostrictive material 30 is in an unstressed condition at the time, a point along the edges of magnetostrictive layers 30 and 50 which have become temporarily easy to magnetize will receive the signal through conductor 40 and form a temporary magnetic field across the gap therebetween which will leave a magnetic signal on tape 70 adjacent that point. All that is necessary to assure that the point where the magnetic signal is left on the tape is correct is to assure that the electrical pulse applied to conductive layer 40 is at the precise desired time after the acoustic pulse is applied to layers 30 and 50 by electrodes 12 and 14. The speed of propagation of the wave from left to right through the piezoelectric material 10 is, of course, known. Thus by timing the propagation of the wave, the exact moment when the signal should be presented to conductor 40 is known and the position of the magnetic signal on tape 70 can be precisely determined.

It should be noted that the closer the spacing between electrodes 12 and 14, the closer point 25 will be to point 26 on wave 23 and the thinner the part of the magnetostrictive material which will be relaxed thus allowing denser concentrations of signals left on the tape so as to permit higher frequency of operation. The speed of propagation of the Rayleigh wave 23 in both directions through material 10 is determined by the material itself and it has been found that, in lithium niobate, for example, the propagation is at about 130,000 inches per second. The frequency of operation determines the number of "channels" of digital information which can be layed down across the width of the tape. If it is assumed that the distance between points 25 and 26 on wave 23 is 0.005 inches and a guard band of like amount exists between adjacent signals, then the acoustic wavelength becomes 0.010 inches which can be the equivalent of a track width on a longitudinal recorder. Furthermore, at 130,000 inches per second for the acoustic wave, an operating frequency of approximately 13 megahertz is possible.

As above described, the pulse of current in the single conductive layer 40 of FIG. 1 creates a magnetic field in only the area which is unstressed by the acoustic wave 23 and the pulse causes a flux to cross the air gap which is used to record on the magnetic tape 70 at that spot. In opposite manner, of course, the magnetic field can be read from the tape by observing the pattern of voltage developed on the conductor as a result of magnetic patterns on the tape as the wave progresses down the head. It may be necessary to absorb the unwanted energy of the wave which has propagated in the wrong direction, i.e., to the left in FIG. 1 by putting an absorbing material at the left end and thus preventing any bouncing back of that wave into the piezoelectric material 10. It may also be desirable to absorb energy at the right end of FIG. 1 to prevent bounce back. Alternately, the unused energy could be used in adjacent heads if desired.

The original stress can be put into the magnetostrictive material not only by utilizing elevated temperatures and different thermal coefficients of expansion and contraction but also by mechanically stressing the piezoelectric material during use or by, for example, bowing the material to create a stress.

It is thus seen that we have constructed a simple recording head which has high frequency response capabilities, is quite durable, and is most precise in use. Many changes will occur to those skilled in the art and I do not wish to be limited to the specific disclosures used in connection with the preferred embodiment. I intend only to be limited by the following claims.

I claim:

1. Apparatus for use in recording information on a magnetic medium movable along a path comprising:
   piezoelectric means having a first substantially planar surface;
   first and second electrodes on the first surface a predetermined distance apart;
   a first magnetostrictive layer on the first surface;
   a second magnetostrictive layer magnetically coupled to the first magnetostrictive layer; and
   a conductive layer between the first and second magnetostrictive layers, the piezoelectric means, the first and second magnetostrictive layers and the conductive layer each having an edge lying in a plane which is adjacent the path.

2. Apparatus according to claim 1 wherein the first and second magnetostrictive layers are stressed with respect to the piezoelectric means.

3. Apparatus according to claim 2 wherein a first signal applied to the first and second electrodes produces an acoustic wave which travels along the first surface to temporarily change the stress in the first and second magnetostrictive layers.

4. Apparatus according to claim 3 wherein a second signal applied to the conducting layer produces a magnetic field at the place where the stress is changed in the first and second magnetostrictive layers to leave a record on the magnetic medium.

5. Apparatus according to claim 4 wherein the first magnetostrictive layer is vacuum deposited on the first surface, the conductive layer is vacuum deposited on the first magnetostrictive layer and the second magnetostrictive layer is vacuum deposited on the conductive layer.

6. Apparatus according to claim 4. including pulse generating means to produce the first signal and timing means to produce the second signal a predetermined time after the first signal.

7. A magnetic recording head comprising:
   first and second magnetostrictive means mounted on opposite sides of a conducting means, the first and second magnetostrictive means and the conducting means being mounted on a substantially planar surface of a piezoelectric base with the magnetostrictive means under stress so as to be non-magnetic, the base, first and second magnetostrictive means and the conducting means each having an edge surface lying in a first plane;
   means connected to the piezoelectric base for producing an acoustic wave which moves along the piezoelectric base to relieve the stress in the first and second magnetostrictive means at the position of the acoustic wave and thus render the magnetostrictive means magnetic; and
   means connected to the conducting means to apply a signal thereto at a time when the acoustic wave is a desired position thus creating a magnetic field at the desired position.

8. Apparatus according to claim 7 wherein a magnetic recording medium is moveable in a path adjacent the first plane so that the magnetic field produces a recording thereon.

9. Apparatus according to claim 7 wherein the first and second magnetostrictive means and the conductive means are vacuum deposited on the substantially planar surface of the piezoelectric base.

10. Apparatus according to claim 9 wherein the first and second magnetostrictive means have a different coefficient of thermal expansion than the piezoelectric base and the vacuum depositing occurs at a temperature other than a first temperature encountered during recording so that at the first temperature the first and second magnetostrictive means are under stress.

11. Apparatus according to claim 7 further including pulse generating means to produce the acoustic wave and timing means to apply the signal to the conducting means a predetermined time after producing the acoustic wave.

* * * * *